Patented Sept. 28, 1948

2,450,108

UNITED STATES PATENT OFFICE 2,450,108

PRODUCTION OF HETEROCYCLIC COMPOUNDS

John George Mackay Bremner and David Gwyn Jones, Norton-on-Tees, England, assignors to Imperial Chemical Industries Limited, a corporation of Great Britain No Drawing. Application November 15, 1945, Serial No. 628,997. In Great Britain December 11, 1944

15 Claims. (Cl. 260—345)

This invention relates to the production of furan derivatives, and in particular to the substitution of a halogen substituted alkyl group in the 2 or 5 position of furan compounds as hereinafter defined.

According to the present invention there is provided a process for the substitution of halogen-substituted alkyl groups in the 2 or 5 position of furan compounds of the type

which comprises reacting them in the presence of a dehydrating agent selected from: zinc chloride, phosphoric acid, concentrated hydrochloric acid, and aluminium chloride, with a hydrogen halide and an aliphatic aldehyde, where R is a carboxyl ester group. The invention is of particular value in relation to the substitution of such halogen-alkyl groups in the saturated alkyl esters.

The reaction may be expressed by the following equation:

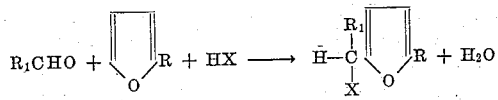

where R has the significance hereinbefore given; $R_1$ is H or an alkyl radicle, particularly a saturated alkyl radicle of not more than five carbon atoms; and X is a halogen.

As a further feature of the invention when $R_1$ is H or a saturated alkyl radicle of not more than five carbon atoms there are also produced compounds of the types:

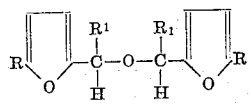

and

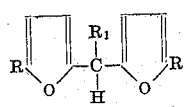

which will for convenience be referred to in this specification as compounds of the types A and B.

Examples of furan compounds suitable as starting materials in the process of the invention are methyl, ethyl and butyl furoates. Examples of suitable aldehydes are formaldehyde and acetaldehyde which may be used in their monomeric or polymeric forms, for example, as paraformaldehyde or paracetaldehyde.

While any hydrogen halide may be used in the process of the invention, it is preferred to employ hydrogen chloride and this is conveniently introduced into the reaction mixture as a gas, preferably after drying. When it is desired to introduce chlor-substituted alkyl groups it is convenient to employ hydrogen chloride both as chlorinating agent and as dehydrating agent. When it is desired to introduce halogen-substituted alkyl groups other than chlorine it is preferred to employ zinc chloride, phosphoric acid or aluminium chloride as dehydrating agent, since hydrochloric acid tends to give chlor-alkyl substituted compounds.

It is convenient, but not necessary, to have present in the reaction mixture an inert organic solvent for one or more of the reactants and/or the products, for example a chlorinated hydrocarbon, as its presence facilitates temperature control, efficient distribution of the gaseous hydrogen halide and the subsequent working up of the products.

In carrying out the reaction it is desirable to avoid unduly high temperatures in the reaction mixture, otherwise the yield of the desired products may be low. Whilst temperatures of up to 100° C. may be employed it is preferred to maintain the temperature of the reaction mixture below 40° C. and more particularly below 30° C. Generally the reaction will be carried out at atmospheric pressure, but higher or lower pressures may be employed.

The reactants are preferably employed in substantially stoichiometric proportions. Water may be present but the reaction is preferably conducted under substantially anhydrous conditions. The presence of a large amount of water adversely affects the reaction.

Working according to the method of the invention the following chlor-alkylated compounds have been prepared in substantial yields:

| Chloralkylated compound | B. P. at reduced pressure mentioned | Reactants and Solvent | Dehydrating Agent |
| --- | --- | --- | --- |
| methyl 5-chloroethyl-2-furoate | Mm. | methyl furoate, acetaldehyde and hydrochloric acid: methylene chloride | zinc chloride. |
| ethyl 5-chloromethyl-2-furoate | 150–152/25 | ethyl furoate, formaldehyde and hydrochloric acid: ethylene chloride | Do. |
| butyl 5-chloromethyl-2-furoate | 134–135/5 | butyl furoate, formaldehyde and hydrochloric acid: methylene chloride | Do. |

It is believed that the halogen-alkyl, including the chloralkyl, furoic acid esters are novel compounds.

When methyl furoate is treated according to the process of the present invention with formaldehyde and hydrochloric acid gas at about 20° C. in the presence of zinc chloride and of a solvent, e. g. methylene chloride, there is produced in addition to the chlormethylated compound, the compound:

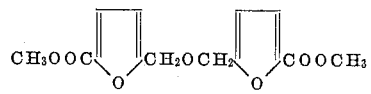

in 20–25% yield. When the same compound is treated at 70° C. in the absence of solvent, in addition to the chlormethylated compound there is produced as the major product the compound:

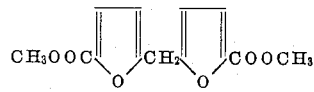

When methyl furoate is treated with formaldehyde and hydrochloric acid gas at temperatures of up to 70° C., and preferably in the order of 30° C. in the presence of aluminium chloride and a solvent, e. g. carbon tetrachloride, there is produced in addition to the chlormethylated compound, the compound:

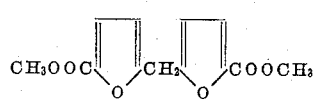

The production of both of these compounds is a further valuable feature of the invention. With methyl furoate the best conversions and yields of the chlormethylated compound were obtained when H₃PO₄ was employed as dehydrating agent.

When ethyl furoate was reacted according to the process of the invention with formaldehyde and hydrochloric acid gas at temperatures below 30° C. using zinc chloride as dehydrating agent the chlormethylated compound

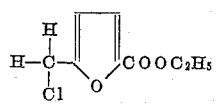

was obtained in 60–65% yield of the theoretical at 80% pass conversion.

When butyl furoate was treated according to the process of the invention with formaldehyde and hydrochloric acid gas at temperatures below 30° C. using zinc chloride as dehydrating agent the chlormethylated compound

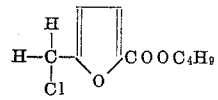

was obtained in 60–65% yield of the theoretical at 100% pass conversion.

The halogen substituted compounds can be separated as follows: The reaction product is poured into water and washed, preferably at least three times, with water; the oily layer is dried, the solvent if one is used, is distilled off under reduced pressure; and the desired product is obtained by fractional distillation under reduced pressure. They may be obtained in the desired state of purity by re-distillation under reduced pressure or, when desirable, by recrystallization from a suitable solvent, e. g. petroleum ether. Alternatively, the reaction product is poured into water, is extracted with a suitable solvent, for example, carbon tetrachloride or ether, is washed several times with water, including one washing with an alkali metal bicarbonate, is dried and distilled under reduced pressure. The compounds of types A and B already referred to generally are higher boiling than the halogen-alkyl-substituted compounds, and can be separated by fractional distillation after removal of the latter.

The invention is illustrated but not limited by the following example.

*Example*

53 gms. of methyl furoate, 18 gms. of paraformaldehyde, 15 gms. of zinc. chloride and 100 mls. of methylene chloride were stirred together in a suitable vessel, maintaining the temperature at 30° C. Dry hydrogen chloride was passed into the mixture while maintaining the temperature at 30° to 35° C., by means of a cooling bath. The stream of hydrogen chloride was continued for about an hour after there was no further tendency for the temperature to rise. By this time the reaction mixture had separated into two layers. The product was poured into water and the methylene chloride layer separated, washed three times with water, dried and distilled. 52 gms. of crude methyl 5-chloromethyl-2-furoate were obtained, most of which boiled at 136° C./15 mm. On cooling, the distilled product solidified to white crystals, which, after recrystallizing from petroleum ether, had a melting point of 32.5° C.

The chloromethyl furoate was characterised by preparing its thiourea derivative which was found to have a melting point of 161.5–162.5° C. and had a nitrogen content of 11.5%, compared with 11.2% calculated.

We claim:
1. A process for the production of a compound having the general formula

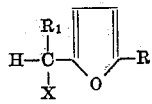

which comprises reacting a compound having the general formula

in the presence of a dehydrating agent selected from the group consisting of zinc chloride, phosphoric acid, concentrated hydrochloric acid and aluminum chloride, with a hydrogen halide and an aldehyde having the general formula $R_1CHO$, where in said formulae R is a carboxyl ester group, X is a halogen, and $R_1$ is a substituent taken from the group consisting of hydrogen and alkyl.

2. A process for the production of a compound having the general formula

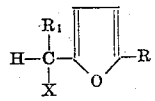

which comprises reacting a compound having the general formula

in the presence of a dehydrating agent selected from the group consisting of zinc chloride, phosphoric acid, concentrated hydrochloric acid and aluminum chloride, with a hydrogen halide and an aldehyde having the general formula $R_1CHO$, where in said formulae R is a carboxyl saturated alkyl ester group, X is a halogen, and $R_1$ is a substituent taken from the group consisting of hydrogen and alkyl.

3. A process for the production of a compound having the general formula

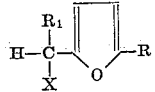

which comprises reacting a compound having the general formula

in the presence of a dehydrating agent selected from the group consisting of zinc chloride, phosphoric acid, concentrated hydrochloric acid and aluminum chloride, with a hydrogen halide and an aldehyde having the general formula $R_1CHO$, where in said formulae R is a carboxyl ester group, X is a halogen, and $R_1$ is a substituent taken from the group consisting of hydrogen and a saturated alkyl radical containing up to five carbon atoms.

4. A process for the production of a compound having the general formula

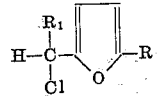

which comprises reacting a compound having the general formula

in the presence of a dehydrating agent selected from the group consisting of zinc chloride, phosphoric acid, concentrated hydrochloric acid and aluminum chloride, with hydrochloric acid and an aldehyde having the general formula $R_1CHO$, where in said formulae R is a carboxyl ester group and $R_1$ is a substituent taken from the group consisting of hydrogen and alkyl.

5. A process for the production of a compound having the general formula

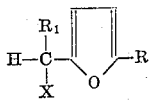

which comprises reacting a compound having the general formula

in the presence of a solvent and of a dehydrating agent selected from the group consisting of zinc chloride, phosphoric acid, concentrated hydrochloric acid and aluminum chloride, with a hydrogen halide and an aldehyde having the general formula $R_1CHO$, where in said formulae R is a carboxyl ester group, X is a halogen, and $R_1$ is a substituent taken from the group consisting of hydrogen and alkyl.

6. A process for the production of a compound having the general formula

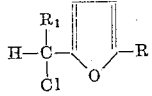

which comprises reacting a compound having the general formula

in the presence of zinc chloride as a dehydrating agent, with hydrochloric acid gas and an aldehyde having the general formula $R_1CHO$, where in said formulae R is a carboxyl ester group and $R_1$ is a substituent taken from the group consisting of hydrogen and a saturated alkyl radical containing up to five carbon atoms.

7. A process for the production of a compound having the general formula

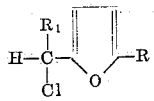

which comprises reacting a compound having the general formula

in the presence of phosphoric acid as a dehydrating agent, with hydrochloric acid gas and an aldehyde having the general formula $R_1CHO$ where in said formulae R is a carboxyl ester group and R₁ is a substituent taken from the group consisting of hydrogen and a saturated alkyl radical containing up to five carbon atoms.

8. A process for the production of ethyl 5-chloromethyl-2-furoate which comprises reacting ethyl furoate, formaldehyde and hydrochloric acid gas at a temperature not to exceed 30° C. in the presence of zinc chloride.

9. A process for the production of methyl 5-chloromethyl-2-furoate and of

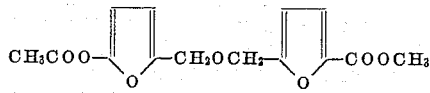

which comprises reacting methyl furoate, formaldehyde and hydrochloric acid gas at a temperature below 30° C. in the presence of a solvent and of zinc chloride.

10. A process for the production of methyl 5-chloromethyl-2-furoate and of

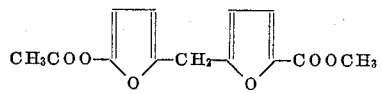

which comprises reacting methyl furoate, formaldehyde and hydrochloric acid gas at a temperature of about 70° C. in the absence of a solvent and in the presence of zinc chloride.

11. A process for the production of methyl 5-chloromethyl-2-furoate and of

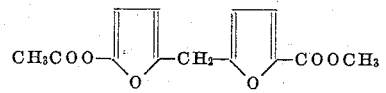

which comprises reacting methyl furoate, formaldehyde and hydrochloric acid gas at a temperature of about 30° C. to 70° C. in the presence of a solvent and of aluminum chloride.

12. A process for the production of a compound having the general formula

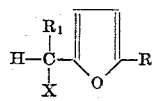

which comprises reacting a compound having the general formula

in the presence of a dehydrating agent selected from the group consisting of zinc chloride, phosphoric acid, concentrated hydrochloric acid and aluminum chloride, with a hydrogen halide and an aldehyde having the general formula R₁CHO, where in said formulae R is a carboxyl ester group, X is a halogen, and R₁ is a substituent taken from the group consisting of hydrogen and alkyl, and separating the halogen-alkyl substituted compound by pouring the reaction product into water, washing it several times with water, drying the oily layer, and fractionally distilling under reduced pressure.

13. A process for the production of a compound having the general formula

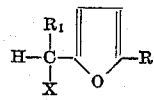

and a di-2 furoic acid ester having a general formula taken from the group consisting of

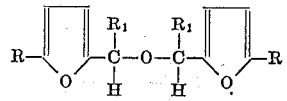

and

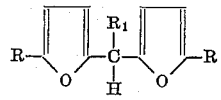

which comprises reacting a compound of the type

in the presence of a dehydrating agent selected from the group consisting of zinc chloride, phosphoric acid, concentrated hydrochloric acid and aluminum chloride, with a hydrogen halide and an aldehyde having the general formula R₁CHO, where in said formulae R is a carboxyl ester group, X is a halogen, and R₁ is a substituent taken from the group consisting of hydrogen and a saturated alkyl radical containing up to five carbon atoms, separating the halogen-alkyl substituted compound by pouring the reaction product into water, washing it several times with water, drying the oily layer and fractionally distilling under reduced pressure, and then separating the di-2-furoic acid ester from the residue by fractional distillation.

14. A compond having the general formula

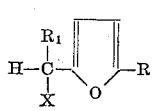

wherein R is a carboxyl ester group, X is a halogen, and R₁ is a substituent taken from the group consisting of hydrogen and alkyl.

15. A process for the production of a compound having the general formula

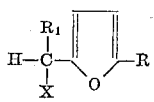

which comprises reacting a compound having the general formula

at a temperature of less than 40° C. in the presence of a dehydrating agent selected from the group consisting of zinc chloride, phosphoric acid, concentrated hydrochloric acid and aluminum chloride, with a hydrogen halide and an aldehyde having the general formula R₁CHO, where in said formulae R is a carboxyl ester group, X is a halogen, and R₁ is a substituent taken from the group consisting of hydrogen and alkyl.

JOHN GEORGE MACKAY BREMNER.
DAVID GWYN JONES.

REFERENCES CITED

The following references are of record in the file of this patent:

UNITED STATES PATENTS

| Number | Name | Date |
|---|---|---|
| 2,256,381 | Dickey | Sept. 16, 1941 |